(12) United States Patent
Köster et al.

(10) Patent No.: US 6,168,865 B1
(45) Date of Patent: Jan. 2, 2001

(54) COATING AGENT, PROCESS FOR PRODUCING THE SAME AND ITS USE, IN PARTICULAR FOR LACQUERING THE OUTSIDE OF PACKAGES

(75) Inventors: Bernhard Köster, Steinfurt; Ludger Keweloh, Sendenhorst; Jörg Kipp, Telgte; Lazaros Vogdanis, Munster; Dietmar Chmielewski, Düsseldorf, all of (DE)

(73) Assignee: PPG Industries Ohio, Inc., Cleveland, OH (US)

( * ) Notice: Under 35 U.S.C. 154(b), the term of this patent shall be extended for 0 days.

(21) Appl. No.: 09/202,393

(22) PCT Filed: Aug. 25, 1997

(86) PCT No.: PCT/EP97/04623
§ 371 Date: Aug. 9, 1999
§ 102(e) Date: Aug. 9, 1999

(87) PCT Pub. No.: WO98/12272
PCT Pub. Date: Mar. 26, 1998

(30) Foreign Application Priority Data

Sep. 18, 1996 (DE) .............................. 196 37 970

(51) Int. Cl.[7] ............................................ B32B 15/08
(52) U.S. Cl. ...................... 428/418; 525/438; 525/533
(58) Field of Search ..................... 525/533, 438; 428/418

(56) References Cited

U.S. PATENT DOCUMENTS

| | | | |
|---|---|---|---|
| 4,212,781 | 7/1980 | Evans et al. | 260/29.4 |
| 4,247,439 | 1/1981 | Matthews et al. | 260/29.6 NR |
| 4,316,940 | 2/1982 | Thornley | 428/413 |
| 4,403,003 | 9/1983 | Backhouse | 427/407.1 |
| 4,600,737 | 7/1986 | Georgalas et al. | 523/414 |
| 4,740,566 | 4/1988 | Tremper, III | 525/438 |
| 4,997,865 | 3/1991 | Scherping et al. | 523/409 |
| 5,028,639 | 7/1991 | Treutlein et al. | 523/200 |
| 5,322,863 | 6/1994 | Figge et al. | 523/415 |
| 5,326,820 | 7/1994 | Hoffmann et al. | 525/123 |

FOREIGN PATENT DOCUMENTS

| | | |
|---|---|---|
| 3908104 | 3/1989 | (DE) . |
| 523 940 A2 | 7/1992 | (EP) . |
| 669 382 A1 | 2/1994 | (EP) . |

OTHER PUBLICATIONS

Encyclopedia of Polymer Science and Technology, vol. 11, p. 114.

*Primary Examiner*—Robert Dawson
*Assistant Examiner*—D. Aylward
(74) *Attorney, Agent, or Firm*—Deborah M. Altman

(57) ABSTRACT

The present invention relates to a coating composition comprising one or more hydroxyl-containing, modified or nonmodified polyesters and one or more hydroxyl-reactive crosslinkers, characterized in that the coating composition comprises as binder a mixture of

- A1) from 35 to 95% by weight of one or more hydroxyl-containing polyesters (A1) having an OH number of from 15 to 210 mg of KOH/g, an acid number of from 10 to 120 mg of KOH/g and a number-average molecular weight of from 500 to 6,000 g/mol,
- A2) from 2 to 50% by weight of one or more water-thinnable, modified epoxy resin esters (A2), and
- A3) from 0 to 20% by weight of one or more water-thinnable, hydroxyl-containing, epoxy resin-modified alkyd resins (A3), the sum of the proportions by weight of components (A1) to (A3) being in each case 100% by weight and the proportions by weight being based in each case on the solids content of the binders (A1) to (A3).

12 Claims, No Drawings

COATING AGENT, PROCESS FOR PRODUCING THE SAME AND ITS USE, IN PARTICULAR FOR LACQUERING THE OUTSIDE OF PACKAGES

The present invention relates to a coating composition comprising one or more hydroxyl-containing, modified or nonmodified polyesters and one or more hydroxyl-reactive crosslinkers.

The invention additionally relates to processes for preparing these processing compositions and to their use for coating metal substrates, especially for the exterior coating of packaging containers.

Packaging containers, for example cans, tubes, canisters, pails and the like, generally have a coating on their exterior faces that serves primarily for decoration and to protect the packaging containers against corrosion. For this reason, a fundamental requirement of suitable coating compositions is unhindered processing and the development of flawless surfaces. The flawless decoration must, however, withstand the sometimes extreme stresses in the course of preparation and use of the packaging containers (folding, flanging, deformation, sterilization, pasteurization, etc).

The exterior coating of packaging containers generally consists of a multicoat system comprising a basecoat as support for the decoration, a coating of printing ink and, if desired, a colorless protective coat, the so-called "silver varnish". Particularly stringent requirements are placed on basecoats which are not provided with a colorless protective coating as outer finish. Such basecoats are also known under the name non-varnish outer coating.

Non-varnish outer coatings must be particularly compatible with the subsequent printing; in other words, they must be readily printable and exhibit good adhesion promotion and a good condensation effect. The resulting coatings must be of high gloss, i.e. have a degree of gloss (60° reflection angle)>80 and high whiteness and must possess high abrasion resistance and a smooth surface structure, i.e. must, for instance, exhibit no craters or the like. In addition, they must have these good properties even after the conditions of sterilization and/or pasteurization.

Non-varnish exterior coatings of this kind are known (cf. e.g. Ullmanns Encyklopädie der technischen Chemie, 4th edition, 1978, volume 15, pages 713–714). Base raw materials for these coatings are modified alkyd resins, epoxy resins, epoxy resin esters, polyester and polyacrylate resins and also usually amino- or phenol-formaldehyde resins or isocyanates as crosslinking components.

With the increasing production speed of the coating lines for two-piece beverage cans and the like, and the high stress on the applied coating composition in the so-called "spin necking" process, in which the cans are subjected to very high deformation in their upper region, great problems occur with the known exterior can coatings. For instance, it must be ensured, even with the extremely severe deformation during spin necking, that there is no damage to the coating film. This requirement can only be met by means of coating compositions which lead to flexible coating films. On the other hand, however, it must also be ensured that the resulting coatings withstand the extreme mechanical stresses in the course of both can production and can filling. This means that the resulting coating films must have high abrasion resistance and a correspondingly high hardness, especially scratch hardness. It is true that isocyanate-crosslinked systems meet the requirement for good elasticity coupled with good hardness, but such systems have the disadvantage of a marked tendency to yellow in the case of pigmented white paints.

A further disadvantage of the known coating compositions is that they are conventional, i.e. organically dissolved, systems. Because of the prescribed application viscosities, these coating compositions usually comprise between 30 and 50% by weight of organic solvent, resulting in severe pollution of the environment as a result of solvent emission when the coatings are baked. Accordingly, increased efforts are being made to provide aqueous systems.

U.S. Pat. No. 4,247,439 and European Patents Nos. 6334 and 6336 disclose hydrolysis-stable aqueous coatings, in particular for interior can coating, which are obtained from esterification products of epoxy resins with carboxyl-functional polyacrylate resins.

Furthermore, U.S. Pat. No. 4,212,781 discloses resin mixtures which can be dispersed in an aqueous, basic medium and are obtained by copolymerization of ethylenically unsaturated monomers, in part containing carboxyl groups, in the presence of an aliphatic or aromatic 1,2-diepoxy resin using at least 3% by weight, based on the monomer weight, of benzoyl peroxide or equivalent initiators. The resin mixtures known from U.S. Pat. No. 4,212,781 can be crosslinked with amino resins. They are particularly suitable for the spray coating of beverage cans.

DE-A 34 46 178 discloses water-thinnable compositions for the coating of metal cans, the polymer present in the composition consisting of a reaction product of acrylic monomers, a high molecular weight epoxy resin, a phenol-formaldehyde resin and a free-radical initiator.

The prior-art aqueous systems for the exterior coating of two-piece beverage cans are primarily employed on aluminum substrates. They have the disadvantage that on problematic substrates, for example deep-drawn and wall-ironed beverage cans made of tinplate, they offer inadequate surface protection.

Moreover, the international patent applications with the international publication numbers WO 88/01287 and WO 91/10712 disclose coating compositions for interior can coating where the binder is obtainable by first of all esterifying an epoxy resin with a polyester and, in the presence of this reaction product, preparing an acrylate copolymer. A disadvantage, however, is that the process for preparing the binders is very complex.

Finally, WO 90/10678 discloses conventional coating compositions for exterior can coating, comprising as binders hydroxyl-containing, modified or nonmodified polyesters and/or hydroxyl-containing acrylate copolymers and/or hydroxyl-containing epoxy resins and, as crosslinkers, blocked isocyanates and/or amino resins. Further details regarding suitable binder mixtures are, however, not present in WO 90/10678. Rather, it is essential to the invention that these coating compositions described in WO 90/10678 contain a wax paste as lubricant which comprises at least one polyolefin wax, at least one hydroxyl-containing acrylate copolymer, optionally one or more melamine-formaldehyde resins and organic solvent. A feature of these coating compositions known from WO 90/10678 that is in need of improvement is the pasteurization resistance of the resulting coatings.

The object of the present invention is therefore to provide a coating composition which is suitable for the coating of metal substrates, especially for the exterior coating of packaging containers, preferably deep-drawn beverage cans, and which should be available for use both conventionally and in the form of aqueous binder dispersions. The coatings produced from these coating compositions should combine good hardness with a high elasticity so as to withstand the mechanical stresses in the course of can production and can filling. Furthermore, the coatings should have a smooth surface structure, a high degree of gloss and good printability, and should in particular possess good adhesion to the various can materials, for example tinplate, blackplate and surface-treated steel and also aluminum. Furthermore, the coating compositions under discussion should be capable of application using the customary equipment.

In the case of the aqueous coating compositions, they should as far as possible attain the level of properties of known conventional exterior coatings in respect of hardness, elasticity, adhesion and resistance to pasteurization and to solvents. Furthermore, such aqueous coating compositions should preferably exhibit a long shelf life of the binder dispersions.

This object is achieved in accordance with the invention by a coating composition of the type specified at the outset which are characterized in that the coating composition comprises as binder a mixture of A1) from 35 to 95% by weight of one or more hydroxyl-containing polyesters (A1) having an OH number of from 15 to 210 mg of KOH/g, an acid number of from 10 to 120 mg of KOH/g and a number-average molecular weight of from 500 to 6,000 g/mol, A2) from 2 to 50% by weight of one or more water-thinnable, modified epoxy resin esters (A2), and A3) from 0 to 20% by weight of one or more water-thinnable, hydroxyl-containing, epoxy resin-modified alkyd resins (A3), the sum of the proportions by weight of components (A1) to (A3) being in each case 100% by weight and the proportions by weight being based in each case on the solids content of the binders (A1) to (A3). The present invention additionally relates to processes for preparing the coating compositions and to the use of the coating compositions for coating metal substrates, especially packaging containers, and with particular preference to their use for the exterior coating of deep-drawn cans.

It is surprising and was not foreseeable that the novel use of the binder mixture of (A1), (A2) and, if used, (A3) produces coating compositions having a good pasteurization resistance and a good hardness with good flexibility at the same time. It is also advantageous that the resulting coatings have a high degree of gloss, a very high whiteness (hiding power), a good surface structure, good adhesion of the coating to various can materials, and good printability. Furthermore, the novel coating compositions have a high solids content.

Finally, the novel coating compositions have the advantage that they can be employed both as conventional and as aqueous coating compositions and that aqueous coating compositions of this kind substantially attain the level of properties of known conventional exterior coatings in respect of leveling, wetting, hardness, elasticity, adhesion and resistance to pasteurization and to solvents.

In the text below, then, the individual constituents of the novel coating compositions will first of all be explained in more detail.

As component (A1) use is made of polyesters having a number-average molecular weight of from 500 to 6,000 g/mol, preferably from 700 to 3,000 g/mol, particularly preferably from 700 to 2,000 g/mol, an OH number of from 15 to 210 mg of KOH/g, preferably from 20 to 160 mg of KOH/g, particularly preferably from 30 to 140 mg of KOH/g, and having an acid number of from 10 to 120 mg of KOH/g, preferably from 20 to 90 mg of KOH/g, particularly preferably from 30 to 70 mg of KOH/g. If use is made as component (A1) of polyesters having a low OH number, the acid number is preferably correspondingly high.

The polyesters employed as component (A1) are prepared in accordance with conditions which are familiar to the skilled worker for polyesterification reactions. The products involved are usually polycondensates of aromatic and/or aliphatic and/or cycloaliphatic dicarboxylic acids and/or polycarboxylic acids, alone or in combination with mono-carboxylic acids, and also aliphatic and/or cycloaliphatic and/or aromatic mono-, di- and/or polyols.

In particular, the acid component employed for preparing the polyesters (A1) comprises aromatic and/or aliphatic and/or cycloaliphatic dicarboxylic acids together with aromatic dicarboxylic anhydrides and/or aromatic tricarboxylic anhydrides and/or tetracarboxylic anhydrides and dianhydrides.

The proportion of trifunctional and optionally higher-functional structural components (acid component and alcohol component) for preparing the polyesters (A1) is chosen such that the polyesters (A1) have the desired molecular weights, OH numbers and acid numbers.

Preferred carboxyl-containing starting compounds for the preparation of the polyesters (component (A1)) are terephthalic acid, isophthalic acid, dimethyl terephthalate, o-phthalic acid, o-phthalic anhydride, trimellitic acid, tetrahydrophthalic acid, hexahydrophthalic acid, trimellitic anhydride, 1,6-naphthalenedicarboxylic acid, adipic acid, sebacic acid, azelaic acid, maleic acid, fumaric acid, glutaric acid and relatively long-chain, aliphatic or cycloaliphatic dicarboxylic acids, for example 1,2-cyclohexanedicarboxylic acid, 1,3-cyclohexanedicarboxylic acid, 1,4-cyclohexane-dicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexane-tetracarboxylic acid, cyclobutanetetracarboxylic acid and others. In addition it is also possible to employ the carboxylic acids known under the term "dimeric fatty acids". Commercial dimeric fatty acids generally include at least 80% by weight of dimeric fatty acid and up to a maximum of 20% by weight of trimers and up to a maximum of 1% by weight of monomers of the corresponding fatty acids. The cycloaliphtatic polycarboxylic acids can be employed both in their cis form and in their trans form and as a mixture of both forms.

Also suitable are the esterifiable derivatives of the above-mentioned polycarboxylic acids, for example their monoesters or polyesters with aliphatic alcohols having 1 to 4 C atoms or hydroxy alcohols having 1 to 4 C atoms. Furthermore, it is also possible to employ the anhydrides of the abovementioned acids or dodecenylsuccinic anhydrides or similar anhydrides, where they exist. The acid component employed preferably comprises, at least in part, trimellitic anhydride.

Examples of monocarboxylic acids, which can optionally be employed together with the polycarboxylic acids, are benzoic acid, tert-butylbenzoic acid, lauric acid, isononanoic acid and hydrogenated fatty acids of naturally occurring oils, preferably isononanoic acid.

Preferred carboxyl-containing starting compounds for the preparation of the polyesters (component (A1)) are diols and triols, alone or in combination with monols and/or more highly functional polyols, such as, for example, ethylene glycol, 1,2- and 1,3-propylene glycol, butanediols, petanediols [sic], 2,2-dimethyl-1,3-propanediol, 2-ethyl-2-butyl-1,3-propanediol, diethylene glycol, dipropylene glycol, hexanediols, 2-methylpentanediol, 2-ethyl-1,4-butanediol, dimethylolcyclohexane, glycerol, trimethylolethane, trimethylolpropane, triethylolbutane, pentaerythritol, dipentaerythritol, poly-aprolactonediols and -triols and also the products obtainable commercially under the name Dianole from Akzo, and other products. It is preferred to employ 1,6-hexanediol, neopentylglycol and trimethylolpropane.

Other diols which can also be employed are aromatic or alkylaromatic diols, for example 2-alkyl-2-phenylpropane-1,3-diol, bisphenol derivatives with ether functionality, etc.

Suitable further diols are also esters of hydroxycarboxylic acids with diols, where the diol employed can be the abovementioned diols. Examples of hydroxycarboxylic acids are hydroxypivalic acid or dimethylolpropanoic acid.

The polyesters (A1) are prepared by the known methods of esterification, as described, for example, in DE-A-40 24 204, page 4, lines 50 to 65.

The reaction customarily takes place at temperatures of between 180 and 280 degrees C., optionally in the presence of an appropriate esterification catalyst, for example lithium octoate, dibutyltin oxide, dibutyltin dilaurate, paratoluenesulfonic acid and the like.

The preparation of the polyesters (A1) can be carried out in the presence of small amounts of an appropriate solvent as entrainer. Examples of entrainers employed are aromatic hydrocarbons, such as in particular xylene and (cyclo) aliphatic hydrocarbons, for example cyclohexane. In addition, however, it is also possible to prepare the polyesters without solvent (reaction in bulk).

As component (A1) it is particularly preferred to employ polyesters which have been prepared by a two-stage process by first of all preparing a hydroxyl-containing polyester having an OH number of from 100 to 400 mg of KOH/g, preferably from 150 to 350 mg of KOH/g, an acid number of less than 10 mg of KOH/g and a number-average molecular weight Mn of from 500 to 2000 g/mol, which is then reacted in a second stage with carboxylic anhydrides to give the desired polyester (A1). Here, the amount of carboxylic anhydrides is chosen such that the resulting polyester has the desired acid number. Acid anhydrides which are suitable for this reaction are all those customarily employed, for example hexahydrophthalic anhydride, trimellitic anhydride, pyromellitic anhydride, phthalic anhydride, maleic anhydride, camphoric anhydride, tetrahydrophthalic anhydride, succinic anhydride and mixtures of these and/or other anhydrides and, in particular, anhyrides [sic] of aromatic polycarboxylic acids, such as trimelletic anhydride.

In addition to this reaction with carboxylic anhydrides, the acid groups can also be introduced into the polyester by using dimethylolpropionic acid and the like.

The hydroxyl-containing polyester employed as component (A1) is selected in particular from the standpoint of controlling the flexibility of the resulting coatings. In particular, this is controlled by way of an appropriate choice of the molecular weights and, preferably, by an appropriate selection of the structural components of the polyester.

It is therefore preferred, as component (A1), to employ polyesters which as structural components comprise trimellitic anhydride, alone or together with other acid components, and/or neopentylglycol, hexanediol and/or trimethylolpropane, alone or together with other alcohol components.

As component (A1) it is also possible to employ the epoxide-modified polyester acrylates described in the international patent application WO 88/01287 on page 6, line 25 to page 13, line 30 and the epoxide-modified polyester acrylates described in the international patent application WO 91/10712 on page 7, line 4 to page 11, line 37, provided they have OH numbers, acid numbers and number-average molecular weights within the abovementioned range and provided the deformability of the resulting coatings satisfies the requirements for the particular intended application.

As component (A1) it is also possible to employ a wide variety of commercial polyesters, provided they have OH numbers, acid numbers and number-average molecular weights within the abovementioned range and provided the deformability of the resulting coatings satisfies the requirements for the particular intended application. Examples of suitable polyesters (A1) are the polyesters obtainable commercially under the trade names Uradil 250, 253, 254, 256, 258 and 1742 from the company DSM and Dynapol 935 from the company Hüls.

As component (A2) use is made of modified epoxy resin esters which in accordance with the invention are waterthinnable. These modified epoxy resin esters that are different from component (A1) are understood as being polymers in which epoxy resins have been incorporated and which have been reacted with various modifying agents, in particular—at least in part—with phosphorus-containing modifying agents.

The epoxy resin esters employed in accordance with the invention can be prepared, for example, by employing epoxy resins as part of the alcohol component during the production of polyesters. Indeed, in addition to the terminal epoxide groups, epoxy resins always contain hydroxyl groups, and are consequently able to replace part of the alcohol component. In addition, however, it is also possible first to prepare a carboxyl-containing polyester and then to react the epoxy resin with the polyester in an epoxy/carboxy esterification reaction.

The epoxy resin content varies in the modified epoxy resin esters and is preferably between 40 and 90% by weight, particularly preferably between 50 and 75% by weight, based on the weight (solids content) of the modified epoxy resin ester (A2). As component (A2) it is preferred to employ phosphorus-modified epoxy resin esters, which with particular preference have a phosphorus content of from 0.5 to 3% by weight, very particularly from 1 to 2.5% by weight of phosphorus, based on the solids content of (A2). In this context, the phosphorus is customarily incorporated into the epoxy resin ester as phosphate, in which case here too the phosphorus content is expressed by way of the abovementioned content of phosphorus and not by way of the phosphate content.

The modified epoxy esters employed as component (A2) usually have a number-average molecular weight of from 1,000 to 3,000 g/mol, preferably from 1,500 to 2,500 g/mol, and an acid number of from 30 to 90 mg of KOH/g, preferably from 35 to 50 mg of KOH/g. The OH number is usually between 100 and 260 mg of KOH/g, preferably between 160 and 200 mg of KOH/g.

With similar preference, the epoxy resin esters employed as component (A2) comprise as further components, in addition to a phosphorus carrier, at least one of the following components, which may also be incorporated into the epoxy resin ester in the form of a polyester contained these components: o-phthalic acid, isophthalic acid, benzoic acid, trimethylolpropane, pentaerythritol, dimeric fatty acid and polypropylene glycol.

The preparation of the polyesters which are employed for preparing component (A2) takes place—as already described for the preparation of the polyesters (A1)—in accordance with conditions which are familiar to the skilled worker for polyesterification reactions. The products involved here are usually likewise polycondensates of aromatic and/or aliphatic and/or cycloaliphatic dicarboxylic acids and/or polycarboxylic acids, alone or in combination with monocarboxylic acids, and also aliphatic and/or cycloaliphatic and/or aromatic mono-, di- and/or polyols. Regarding details and examples of suitable structural components, therefore, reference may be made to the above-mentioned description of component (A1).

For the preparation of the epoxy resin esters, diepoxide compounds, and possibly also monoepoxide compounds, are particularly suitable. For preparing the epoxy resin esters it is preferred to employ epoxy resins based on bisphenol A. It is additionally preferred to employ epoxy resins having an epoxide equivalent weight of not more than 500.

Examples of suitable epoxy resins that may be mentioned also include the products obtainable commercially under the tradename Epikote® 827, 828 and 1001 from the company Shell, Araldit-harz® GY 2600, GY 250, GT 6071 and GT 7071 from the company Ciba Geigy and also DER® 331, 330 and 661 from the company Dow.

The use of the component (A2) brings about an improvement in particular in the pasteurization properties and the adhesion properties of the resulting coating, the addition of this binder surprisingly leaving the other properties, for example the flexibility, of the resulting coatings unimpaired.

As component (A3) use is made in accordance with the invention of epoxy resin-modified, hydroxyl-containing alkyd resins which are different from components (A1) and (A2). The term epoxy resin-modified alkyd resins refers to alkyd resins in which epoxy resins have been incorporated. The epoxy resins can in turn—especially where there is only a low epoxy resin content—have already been employed in connection with the preparation of the alkyd resins (A3) as part of the alcohol component (see above description of component (A2)). However, it is preferred first of all to prepare a carboxyl-containing alkyd resin and then to react the epoxy resin with the alkyd resin in an epoxy/carboxy esterification reaction.

The epoxy resin content varies in the epoxy resin-modified alkyd resins and is preferably between 10 and 40% by weight, particularly preferably between 15 and 20% by weight, based on the weight of the epoxy resin-modified alkyd resin (A3). The oil length of the alkyd resins is usually between 15 and 60% by weight, preferably between 20 and 45% by weight, based in each case on the weight of the alkyd resin (solids content) without the epoxy resin component (i.e. based in general on the weight of the alkyd resin prior to modification with the epoxy resin).

The epoxy resin-modified alkyd resins employed as component (A3) preferably have a number-average molecular weight of from 1000 to 3000 g/mol, preferably from 1500 to 2000 g/mol, and an acid number from 30 to 90 mg of KOH/g, preferably from 40 to 70 mg of KOH/g. The OH number is usually between 60 and 200 mg KOH/g, preferably between 80 and 140 mg of KOH/g.

With regard to suitable structural components of the epoxide-modified alkyd resin (A3) reference may be made to the above description of components (A1) and (A2). With respect to appropriate fatty acids it should be stated that unsaturated fatty acids are preferably employed. Instead of or together with these unsaturated fatty acids it is also possible to employ saturated fatty acids.

Examples of suitable unsaturated fatty acids are palmitoleic acid, oleic acid, linoleic acid, linolenic acid, eleostearic acid and ricinoleic acid, and examples of suitable saturated fatty acids are caproic acid, caprylic acid, capric acid, lauric acid, myristic acid, palmetic acid, stearic acid, arachidic acid, behenic acid and lignoceric acid.

Of course, mixtures of different fatty acids, including for example those in the form of naturally occurring vegetable and animal oils, [lacuna] able be employed.

As component (A3) it is preferred to employ epoxide-modified alkyd resins which as structural components comprise at least one of the following compounds: o-phthalic acid, isophthalic acid, tetrahydrophthalic acid, trimellitic acid, benzoic acid, trimethylolpropane, pentaerythritol, glycerol, palmitinic acid, stearic acid, oleic acid, linoleic acid, octadecadienoic acid and ricinoleic acid. These components are preferably combined with an epoxy resin based on bisphenol A.

Very particular preference is given to employing, as component (A3), the commercial, epoxy resin-modified alkyd resins Resydrol AX 247W and/or Resydrol WE 162 (former product designation) from the company Hoechst.

Finally, the novel coating compositions may additionally comprise one or more carboxyl-containing polymers (A4) which are different from components (A1) to (A3), preferably in an amount of from 5 to 50% by weight, particularly preferably from 2 to 20% by weight, based on the solids contents of the binders (A1) to (A4) and based on the weight of the binder mixture comprising (A1) to (A3).

Examples of suitable binders (A4) are carboxyl-containing acrylate copolymers, carboxyl-containing acrylic-modified polyesters, carboxyl-containing polyurethane resins, carboxyl-containing, acrylic-modified polyurethane resins, epoxy acrylates and the like. It is of course also possible to employ corresponding products that are obtainable commercially.

As component (A4) it is preferred to employ carboxyl-containing polymers having an acid number of from 30 to 100 mg of KOH/g, preferably from 40 to 90 mg of KOH/g, and with a number-average molecular weight of preferably from 2500 to 8000 g/mol.

It is essential to the invention that the coating compositions comprise as binder a mixture of
- A1) from 35 to 95% by weight, preferably from 50 to 90% by weight, particularly preferably from 65 to 87% by weight, of one or more hydroxyl-containing polyesters (A1) having an OH number from 15 to 210 mg of KOH/g, an acid number of from 10 to 120 mg of KOH/g and a number-average molecular weight of from 500 to 6000 g/mol,
- A2) from 2 to 50% by weight, preferably from 4 to 40% by weight, particularly preferably from 6 to 25% by weight, of one or more water-thinnable, modified epoxy resin esters (A2), and
- A3) from 0 to 20% by weight, preferably from 5 to 15% by weight, particularly preferably from 6 to 10% by weight, of one or more water-thinnable, hydroxyl-containing, epoxy resin-modified alkyd resins (A3), the sum of the proportions by weight of components (A1) to (A3) being in each case 100% by weight and the proportions by weight being based in each case on the solids content of the binders (A1) to (A3).

The use of such a mixture of the components (A1) to (A3) as binder in coating compositions has the advantage, in general, that weather-resistant, flexible and, at the same time, hard coatings are obtained.

In the novel coating compositions the binder comprising (A1) to (A4) is usually employed, in the case of the pigmented coating compositions, in an overall amount of from 10 to 40% by weight, preferably from 20 to 30% by weight, based in each case on the solids content of the binders (A1) to (A4) and based on the overall weight of the coating composition.

In the novel coating compositions the binder comprising (A1) to (A4) is usually employed, in the case of the nonpigmented coating compositions, in an overall amount of from 10 to 75% by weight, preferably from 35 to 60% by weight, based in each case on the solids content of the binders (A1) to (A4) and based on the overall weight of the coating composition.

The novel coating compositions additionally comprise a crosslinking agent. In the novel coating compositions, the crosslinker in the case of the pigmented coating compositions is usually employed in an amount of from 4 to 15% by weight, preferably from 5 to 10% by weight, based in each case on the solids content of the crosslinker and based on the overall weight of the coating composition.

In the novel coating compositions, the crosslinker in the case of the nonpigmented coating compositions is usually employed in an amount of from 8 to 30% by weight, preferably from 10 to 20% by weight, based in each case on the solids content of the crosslinker and based on the overall weight of the coating composition.

In accordance with the present invention it is possible as crosslinker (component (B)) to use any desired phenolic resin and/or amino resin provided it has the methylol functionality necessary for reactivity. Preferred phenolic resins are reaction products—prepared under alkaline conditions—of phenol, substituted phenols and bisphenol A with formaldehyde. Under conditions of this type the methylol group is linked to the aromatic ring in either ortho or para position.

Preference is given to the use of phenolic resins of the resol type, which are based on bisphenol A and contain more than one methylol group per phenyl ring.

Typical amino resins are melamine-, benzoguanamine- and urea-formaldehyde resins. These are preferably used in a form in which they are etherified with lower alcohols, mostly methanol and/or ethanol and/or butanol. Suitable amino resins are obtainable, for example, in the market under the tradenames Cymel, Luwipal, Maprenal and Beetle. Particularly suitable amino resins are methoxymethylethoxymethylbenzoguanamine resins and/or hexamethoxymethylmelamine resins.

Of course, in addition to the condensation products with formaldehyde it is also possible to use those with other aldehydes.

Also suitable as component B are isocyanate crosslinkers, which can be employed alone or together (such a blend is used in particular in connection with the coating of packaging containers) with the phenolic and/or amino resin. Examples of such isocyanate crosslinkers are blocked isocyanates, preferably of the hexamethylene diisocyanate or tolylene diisocyanate type, which are obtainable on the market under the trade name Desmodur, for example.

Where the described binder (A) is employed to prepare an aqueous coating composition, use is additionally made as neutralizing agent (component (C)) of from 1 to 7% by weight, preferably from 1 to 5% by weight, based in each case on the overall weight of the binder solution of components (A) to (D), of ammonia and/or amines. Preferred neutralizing agents (C) are triethylamine and/or dimethylethanolamine.

Examples of organic solvents which are suitable as components (D) are monoalcohols having 3 to 18 carbon atoms, for example butanol, isobutanol, propanol and isopropanol; glycol ethers, for example butylglycol, butyldiglycol, hexylglycol and propylene glycol.

As solvents it is preferred to employ, at least in part, those solvents which are likewise suitable as co-solvent for the aqueous dispersion, examples being butanol, butylglycol and butyldiglycol.

The solvents and/or water are usually employed, in the case of the pigmented coating compositions, in amounts of from 10 to 76% by weight, preferably from 25 to 55% by weight, based on the overall weight of the coating composition.

The solvents and/or water are usually employed, in the case of the unpigmented coating compositions, in amounts of from 10 to 80% by weight, preferably from 20 to 55% by weight, based on the overall weight of the coating composition.

In addition to the binder solution described, the coating compositions may optionally also comprise further auxiliaries and additives (component (E)) and, if desired, pigments and/or fillers (component (F)) in amounts which are customary in each case.

The coating compositions normally include an additional 0 to 5.0% by weight, based on the overall weight of the coating composition, of further auxiliaries and additives (E), for example lubricants such as waxes, plasticizers, stabilizers, wetting agents, dispersing aids, catalysts, surface-active additives and rheology-controlling additives, individually or in a mixture.

Examples of rheology-controlling additives are crosslinked polymeric micro particles, as are disclosed, for example, in EP-A-38 127, inorganic phyllosilicates, for example aluminum-magnesium silicates, sodium-magnesium phyllosilicates and sodium-magnesium-fluorine-lithium phyllosilicates of the montmorillonite type, and also synthetic polymers having ionic and/or associative groups, such as polyvinyl alcohol, poly(meth)acrylamide, poly(meth)acrylic acid, polyvinylpyrrolidone, styrene-maleic anhydride or ethylene-maleic anhydride copolymers and their derivatives, or else hydrophobically modified ethoxylated urethanes or polyacrylates. As rheology-controlling additives preference is given to employing polyurethanes.

The novel coating compositions can be employed both in pigmented form and as a clearcoat. The pigments and/or fillers (F) are preferably employed in amounts of from 10 to 45% by weight, particularly preferably from 20 to 35% by weight, based on the overall weight of the coating composition. Examples of suitable pigments are titanium dioxide, for example the products obtainable under the trade name Titan Rutil RN 59, RTC 60, R 900 and RDI-S. Especially when the novel coating compositions are employed in the field of automotive finishing, they may also include the pigments which are customarily employed in this field, examples being special-effect pigments and organic pigments. Special-effect pigments which can be employed are metal flake pigments, such as commercial aluminum bronzes, aluminum bronzes chromated in accordance with DE-A-36 36 183, and commercial stainless steel bronzes, and also nonmetallic special-effect pigments, for example pearl luster pigments or interference pigments. Examples of suitable organic color-imparting pigments are Indanthrene Blue, Chromophthal Red, Irgazine Orange and Heliogen Green.

Suitable fillers are barium sulfate, for example the commercial products Blancfix micro, Blancfix F; silicon dioxide, for example the commercial products Quarzmehl SF 600 quartz flour; potassium carbonate and talc.

The coating compositions are prepared by customary techniques by means of stirring and/or dispersing. The coating compositions are preferably prepared by first of all incorporating, if used, the pigments and/or fillers into the coating composition or the binder mixture, adding further auxiliaries and additives if desired, and then, if desired, incorporating preferably water into the coating composition by dispersion.

The novel coating compositions usually cure in the substrate temperature range from 100 to 400° C. within a period of from 2 s to 10 min. They can be applied by rolling, knife coating, brushing, spraying, flow coating or dipping by means of customary devices, the film subsequently being cured to give a firmly adhering coating. In the case of the can exterior coatings, the coating compositions are preferably applied by means of roller application; in the case of can interior coatings, they are preferably applied by spraying. The novel aqueous coating compositions can also be applied by anodic electrodeposition. In this technique the parts to be coated are immersed in an aqueous bath based on the novel coating compositions described above and are connected as anode. By means of direct current a film is deposited on the cans, the substrate is removed from the bath, and the film is cured by baking. In the case of electrodeposition coating, it is normal to operate with a markedly lower solids content and, correspondingly, a markedly higher water content of the coating compositions than indicated above.

The coating compositions are preferably employed as single coats with a dry film coat thickness of in general from 5 to 25 $\mu$m.

The novel coating compositions are suitable for coating metal substrates of whatever kind, for example iron and ferrous alloys, aluminum and the like. However, they can also be applied to other substrates, for example plastic, wood, glass, paper or the like. Owing to the good weathering stability, high hardness and—at the same time—high flexibility, the novel coating compositions can be employed, for example, in the field of automotive OEM finishing or, if appropriate crosslinkers are chosen, in the field of automotive refinishing.

In particular, however, the novel coating compositions are employed for the coating of packaging containers. In this case the novel coating compositions are preferably employed for the exterior coating of packaging containers, especially cans and the like. They can, however, also be employed for interior coating of cans and the like. In this context the packaging containers can consist of a very wide variety of materials and can have a very wide variety of geometries. Particularly suitable materials are black plate, tinplate and various ferrous alloys, which may have been given a passivating coat based on compounds of nickel, of chromium and of zinc. However, aluminum is also suitable as well. The packaging containers can be coated in the form of, for example, can halves, i.e. bodies and lids, as 3-piece cans and as 2-piece cans which have been deep drawn and wall ironed or otherwise deep drawn, such as, for example, beverage cans and preserve cans.

The coatings obtained from the novel coating compositions are notable for good hardness coupled with good flexibility, and the coatings exhibit good pasteurization resistance and sterilization resistance, a smooth surface structure (freedom from pores), a high degree of gloss, good printability and, in particular, good adhesion to the various can materials, and especially to surface-treated steel substrates. The novel aqueous coating compositions attain at least the level of properties of known conventional exterior coatings in respect of hardness, elasticity, adhesion and resistance to pasteurization and to solvents.

The invention is illustrated in more detail below with reference to working examples. All parts and percentages in these examples are by weight unless expressly stated otherwise.

1.1 Preparing the Water-thinnable Polyester Resin A1-1

34.584 parts of neopentylglycol are weighed out into a 4 l stainless steel reactor fitted with stirrer, column, thermometer and water separator and are melted. Then 23.100 parts of isophthalic acid, 5.874 parts of terephthalic acid, 5.371 parts of adipic acid and 0.033 parts of dibutyltin oxide as esterification catalyst are added. The mixture is slowly heated to 220° C. and is condensed at 220° C. to an acid number of from 2.0 to 4.0 mg of KOH/g and an OH number of 220–225 of mg of KOH/g. In this procedure, care should be taken to ensure that the column overhead temperature does not exceed 100° C. After the acid number of from 2 to 4 mg of KOH/g has been reached, the mixture is cooled to 150° C. and then 9.927 parts of trimellitic anhydride are added. It is subsequently heated to 170° C. and the temperature is maintained until an acid number of 46 to 50 mg of KOH/g and a viscosity of 2.1 to 2.5 dPa.s (ICI plate/cone viscometer, 23° C., 50% strength in butylglycol) is reached. The mixture is then cooled to 130° C. and diluted with 16.935 parts of butylglycol. This is followed by further cooling, and at below 100° C. 4.176 parts of dimethylethanolamine are added with stirring over a period of about 15 minutes. The mixture is then cooled and filtered. The resulting solution of the polyester A1-1 has a solids content of 77–79% (60 min, 130° C., 3 ml of xylene). The resulting polyester resin A1-1 has an OH number of 106 mg of KOH/g, an acid number of 43–47 mg of KOH/g, a number-average molecular weight of 1580 g/mol (measured with GPC against polystyrene standard) and a viscosity of 5.4–6.4 dPa.s (ICI plate/cone viscometer, 23° C., 55% strength in butylglycol).

1.2. Preparing the Organically Dissolved Polyester Resin A1-2

33.783 parts of neopentylglycol are weighed out into a 4 l stainless steel reactor fitted with stirrer, column, thermometer and water separator and are melted. Then 22.565 parts of isophthalic acid, 5.738 parts of terephthalic acid, 5.247 parts of adipic acid and 0.032 parts of dibutyltin oxide as esterification catalyst are added. The mixture is slowly heated to 220° C. and is condensed at 220° C. to an acid number of from 2.0 to 4.0 mg of KOH/g and an OH number of 220–225 mg of KOH/g. In this procedure, care should be taken to ensure that the column overhead temperature does not exceed 100° C. After the acid number of from 2 to 4 mg of KOH/g has been reached, the mixture is cooled to 150° C. and then 9.697 parts of trimellitic anhydride are added. It is subsequently heated to 170° C. and the temperature is maintained until an acid number of 46 to 50 mg of KOH/g and a viscosity of 2.1 to 2.5 dPa.s (ICI plate/cone viscometer, 23° C., 50% strength in butylglycol) is reached. The mixture is then cooled to 130° C. and diluted with 22.938 parts of butylglycol. The mixture is then cooled and filtered. The resulting solution of the polyester A1-2 has a solids content of 74–76% (60 min, 130° C., 3 ml of xylene). The resulting polyester resin A1-2 has an OH number of 106 mg of KOH/g, an acid number of 43–47 mg of KOH/g, a number-average molecular weight of 1580 g/mol (measured with GPC against polystyrene standard) and a viscosity of 2.0–2.6 dPa.s (ICI plate/cone viscometer, 23° C., 50% strength in butylglycol).

EXAMPLE 1

Preparing and Applying an Aqueous Coating Composition 1

To prepare the aqueous coating composition 1, 30.0 parts of the polyester A1-1, 0.4 parts of dimethylethanolamine, 7.0 parts of butyldiglycol, 3.0 parts of a commercial epoxy resin-modified alkyd resin A3 (70% strength in butylglycol/methoxypropanol with a content of the resin solution of about 22.5% of butylglycol and about 7.5% of methoxypropanol, OH number 100 mg of KOH/g, acid number 40–60 mg of KOH/g, viscosity, diluted to 50% with methoxypropanol, at 23° C. of 300–600 mPa.s; commercial product Resydrol® AX 247 from the company Hoechst AG) are initially introduced and 28.0 parts of titanium dioxide of rutile type are incorporated by dispersion using a dissolver. 0.3 part of a commercial, 100% pure polytetrafluoroethylene wax with a melting point >150° C. (commercial product SST 3 from the company Shamrock, USA), 5.0 parts of a commercial, liquid-viscous methoxymethylethoxymethylbenzoguanamine resin (>98% pure; commercial product Cymel 1123 from Dyno Cytec), 1.5 parts of a commercial, liquid-viscous hexamethoxymethylmelamine resin (>98% pure: commercial product Cymel 303 from Dyno Cytec), 2.5 parts of a commercial modified epoxy resin ester A2 (modified epoxy resin ester, 75% strength in ethoxypropanol, the solution also containing 6% of butyl glycol, neutralized with 6.5% N,N-dimethylethanolamine, bonded as salt, acid number 40 mg of KOH/g, OH number 180 mg of KOH/g, viscosity, diluted to 50% with methoxypropanol, at 23° C. of 300–700 mPa.s; commercial product Resydrol® VWE 5171 from the company Hoechst AG), 1.1 parts of acrylate dispersion A4 (solids content 34%, content of water of 42.03%, butyldiglycol of 11.15%, of butylglycol of 9.16% and of dimethylethanolamine of 3.66%, an acid number of the acrylate resin of 61–65 mg of KOH/g and a number-average molecular weight of 6,000 and a Brookfield viscosity at 25° C. of 900–1500 mPa.s) and 0.9 parts of a commercial, aqueous carnauba wax dispersion (melting point 80° C., solids content 28.5–31%, commercial product LUBA print CA 30 from the company L.P. Bader & Co. GmbH) are added with stirring. Subsequently, 20.3 parts of deionized water are incorporated by dispersion into the mixture. The composition of the binder mixture employed in the coating composition 1 is summarized in Table 1.

A non-lacquered two-piece beverage can made of tinplate (E 2.0/2.0) is coated by roller application with the coating composition 1. The coating is baked twice at 190° C. for 20 s and once at 230° C. for 5 min. The result is a coating with a dry film coat thickness of 11 μm. The test results of the resulting coating are set out in Table 2.

EXAMPLE 2

Preparing and Applying a Conventional Coating Composition 2

To prepare the conventional coating composition 2, 30.0 parts of the polyester A1-2, 7.0 parts of butyldiglycol, 3.0 parts of a commercial epoxy resin-modified alkyd resin A3 (70% strength in butylglycol/methoxypropanol with a content of the resin solution of about 22.5% of butylglycol and about 7.5% of methoxypropanol, OH number 100 mg of KOH/g, acid number 40–60 mg of KOH/g, viscosity, diluted to 50% with methoxypropanol, at 23° C. of 300–600 mPa.s; commercial product Resydrol® AX 247 from the company Hoechst AG) are initially introduced and 28.0 parts of titanium dioxide of rutile type are incorporated by dispersion using a dissolver. 0.3 parts of a commercial, 100% pure polytetrafluoroethylene wax with a melting point >150° C.

(commercial product SST 3 from the company Shamrock, USA), 5.0 parts of a commercial, liquid-viscous methoxymethylethoxymethylbenzoguanamine resin (>98% pure; commercial product Cymel 1123 from Dyno Cytec), 1.5 parts of a commercial, liquid-viscous hexamethoxymethylmelamine resin (>98% pure: commercial product Cymel 303 from Dyno Cytec), 2.5 parts of a commercial modified epoxy resin ester A2 (modified epoxy resin ester, 75% strength in ethoxypropanol, the solution also containing 6% of butylglycol, neutralized with 6.5% N,N-dimethylethanolamine, bonded as salt, OH number 180 mg of KOH/g, acid number 40 mg of KOH/g, viscosity, diluted to 50% with methoxypropanol, at 23° C. of 300–700 mPa.s; commercial product Resydrol® VWE 5171 from the company Hoechst AG), 1.1 parts of acrylate dispersion A4 (solids content 34%, content of water 42.03%, of butyldiglycol 11.15%, of butylglycol 9.16% and of dimethylethanolamine 3.66%, an acid number of the acrylate resin of 61–65 mg of KOH/g and a number-average molecular weight of 6,000 and a Brookfield viscosity at 25° C. of 900–1500 mPa.s) and 0.9 parts of a commercial, aqueous carnauba wax dispersion (melting point 80° C., solids content 28.5–31%, commercial product LUBA print CA 30 from the company L.P. Bader & Co. GmbH) are added with stirring. Then, 20.7 parts of butyldiglycol are added to the mixture. The composition of the binder mixture employed in the coating composition 2 is summarized in Table 1.

The application and curing of the coating composition 2 and the testing of the resulting coating are carried out as for Example 1. The test results of the resulting coating are set out in Table 2.

EXAMPLE 3
Preparing and Applying an Aqueous Coating Composition 3

In a manner similar to that of Example 1, an aqueous coating composition 3 is prepared, with the sole difference that the 3.0 parts of the expoxide-modified alkyd resin A3 were omitted without replacement. The composition of the binder mixture employed in the coating composition 3 is summarized in Table 1.

The application and curing of the coating composition 3 and the testing of the resulting coating are carried out as for Example 1. The test results of the resulting coating are set out in Table 2.

EXAMPLE 4
Preparing and Applying a Conventional Coating Composition 4

In a manner similar to that of Example 2, a conventional coating composition 4 is prepared, with the sole difference that the 3.0 parts of the expoxide-modified alkyd resin A3 were omitted without replacement. The composition of the binder mixture employed in the coating composition 4 is summarized in Table 1.

The application and curing of the coating composition 4 and the testing of the resulting coating are carried out as for Example 1. The test results of the resulting coating are set out in Table 2.

Comparison Example 1

In a manner similar to that of Example 1, an aqueous coating composition V1 is prepared, with the sole difference that the 2.5 parts of the modified epoxy resin ester A2 and the 3.0 parts of the epoxide-modified alkyd resin A3 were replaced by a total of 5.5 parts of the polyester resin A1-1. The composition of the binder mixture employed in the coating composition V1 is summarized in Table 1.

The application and curing of the coating composition V1 and the testing of the resulting coating are carried out as for example 1. The test results of the resulting coating are set out in Table 2.

Comparison Example 2

In a manner similar to that of Example 1, an aqueous coating composition V2 is prepared, with the sole difference that the 30.0 parts of the polyester resin A1-1 and the 3.0 parts of the epoxide-modified alkyd resin A3 were replaced by a total of 33.0 parts of the modified epoxy resin ester A2. The composition of the binder mixture employed in the coating composition V2 is summarized in Table 1.

The application and curing of the coating composition V2 and the testing of the resulting coating are carried out as for example 1. The test results of the resulting coating are set out in Table 2.

Comparison Example 3

In a manner similar to that of Example 1, an aqueous coating composition V3 is prepared, with the sole difference that the 2.5 parts of the modified epoxy resin ester A2 an d the 30.0 parts of the polyester resin A1-1 were replaced by a total of 32.5 parts of the epoxide-modified alkyd resin A3. The composition of the binder mixture employed in the coating composition V3 is summarized in Table 1.

The application and curing of the coating composition V3 and the testing of the resulting coating are carried out as for example 1. The test results of the resulting coating are set out in Table 2.

Comparison Example 4

In a manner similar to that of Example 1, an aqueous coating composition V4 is prepared, with the sole difference that the 2.5 parts of the modified epoxy resin ester A2 were replaced by 2.5 parts of the polyester resin A1-1. The composition of the binder mixture employed in the coating composition V4 is summarized in Table 1.

The application and curing of the coating composition V4 and the testing of the resulting coating are carried out as for example 1. The test results of the resulting coating are set out in Table 2.

TABLE 1

Composition of the binder mixtures employed in the coating compositions, in parts of the respective binder solution or dispersion employed, and in brackets in % by weight, based on the solids content and based [lacuna] the overall weight of the binder mixture comprising (A1) + (A2) + (A3)

| Binder | B 1 | B 2 | B 3 | B 4 | V 1 | V 2 | V 3 | V 4 |
|---|---|---|---|---|---|---|---|---|
| A1-1 | 30 p | — | 30 p | — | 35.5 p | — | — | 32.5 p |
|      | 85.4% | 0% | 92.7% | 0% | 100% | 0% | 0% | 92% |
| A1-2 | — | 30 p | — | 30 p | — | — | — | — |
|      | 0% | 85.4 % | 0% | 92.7% | 0% | 0% | 0% | 0% |
| A2 | 2.5 p | 2.5 p | 2.5 p | 2.5 p | — | 35.5 p | — | — |
|    | 6.6 % | 6.6% | 7.3% | 7.3% | 0% | 100% | 0% | 0% |
| A3 | 3.0 p | 3.0 p | — | — | — | — | 35.5 p | 3.0 p |
|    | 8% | 8% | 0% | 0 % | 0% | 0% | 100% | 8% |
| A4 | 1.1 p | 1.1 p | 1.1 p | 1.1 p | 1.1 p | 1.1 p | 1.1 p | 1.1 p |

Key to Table 1:
Binder A1-1: acrylate dispersion A1-1 described in Example 1
Binder A1-2: acrylate dispersion A1-2 described in Example 2
Binder A2: modified epoxy resin ester A2 described in Example 1
Binder A3: epoxide-modified alkyd resin A3 described in Example 1
Binder A4: acrylate dispersion A4 described in Example 1

Example 1

TABLE 2

Test results of the resulting coatings

| | B1 | B2 | B3 | B4 | V1 | V2 | V3 | V4 |
|---|---|---|---|---|---|---|---|---|
| 206 spin neck[1] | 2 | 2 | 2 | 2 | 2 | 5 | 5 | 2 |
| Printability[2] | 2 | 2 | 2 | 2 | 2 | 2 | 2 | 2 |
| MEK[3] | 1 | 1 | 1 | 1 | 1 | 1 | 1 | 1 |
| Pasteuriz.[4] | 1 | 1 | 1 | 1 | 5 | 1 | 3 | 5 |
| Elasticity[5] | 2 | 2 | 2 | 2 | 2 | 5 | 5 | 2 |
| Adhesion[6] | 2 | 2 | 2 | 2 | 5 | 1 | 2 | 4 |
| Shelf life[7] | 1 | 1 | 4 | 2 | 4 | 2 | 1 | 1 |
| Yellowing[8] | 1 | 1 | 1 | 1 | 1 | 1 | 1 | 1 |
| Whiteness[9] | 1 | 1 | 1 | 1 | 1 | 1 | 1 | 1 |

Key to Table 2:
In all tests, the rating 1 means very good, the rating 3 means still satisfactory and the rating 5 is the worst rating.
[1]The 206 spin neckability indicates whether the coating after the 2nd drying is damaged by mechanical deformation in the Metal Box Spin Necker diameter 206.
[2]Printability was assessed visually. A test was carried out as to whether the printing ink was able to develop a coherent, glossy film.
[3]In the MEK test, a cotton wad soaked with methyl ethyl ketone is moved in regular double strokes over the film until the substrate is visible. The applied force is about 20 N. The MEK test is carried out straight after the white paint has dried.
[4]The pasteurization stability is assessed by pasteurizing the coated can for 30 minutes at 85° C. with a 0.1% strength Na$_2$Co$_3$ solution. Afterwards, the Tesafilm [adhesive tape] tearoff and water uptake are tested.
[5]The elasticity is assessed by Erichsen Cupping (1st and 2nd pass).
[6]Adhesion was assessed by carrying out a crosshatch test with Tesafilm tearoff.
[7]The shelf life was assessed by storing the coating compositions for 6 months at room temperature and then assessing the properties of the coating composition.
[8]The yellowing resistance is assessed by carrying out a visual comparison of the baked can with a can which has only been subjected to drying of the white paint.
[9]The whiteness is assessed by applying the test coating composition and a standard coating composition to a panel, in each case by knife coating at the same coat thickness, and conducting comparative visual assessment of the resulting coating.

Summary of the Test Results

Comparison of Examples 1, 2, 3 and 4 and of Comparison Examples 1 to 4 shows that the coating compositions of Examples 1 to 4 have outstanding resistances and very good mechanical properties, especially an excellent spin neckability on deep-drawn cans made of tin-plated steel. In addition, the printability is comparable with that of known exterior coatings. The pasteurization resistance of both the solvent-containing and the aqueous coating composition corresponds to the stringent requirements as are demanded on conventional, solvent-based packaging coatings. Comparison of Examples 1 and 3 with comparison Examples 1 to 4 shows that the use of A1-1 and the addition of the modified epoxy resin ester A2 produces coating compositions having both good deformability and good pasteurization resistance, whereas the use of the polyester A1-1 without the addition of A2 (Comparison Example 1) leads to poor pasteurization resistance and poor adhesion, and the use of A2 without the addition of A1-1 (Comparison Example 2) leads to poor elasticity and thus to poor deformability of the coatings. The use of the alkyd resin A3 alone without the addition of A1-1 and A2 (Comparison Example 3) likewise leads to poor elasticity and thus to poor deformability of the coatings. The combination of the binders A1-1 and A3 (Comparison Example 4), in contrast, has the disadvantage that the pasteurization resistance is impaired.

What is claimed is:

1. A coating composition comprising a crosslinker component and a binder component, wherein the crosslinker component comprises at least one hydroxyl-reactive crosslinker, and wherein the binder component comprises a mixture of:
   A1) from 35 to 95% by weight of at least one hydroxyl-containing polyester having an OH number ranging from 15 to 210 mg of KOH/g, an acid number ranging from 10 to 120 mg of KOH/g, and a number-average molecular weight ranging from 500 to 6,000 g/mol.,
   A2) from 2 to 50% by weight of at least one water-thinnable, phosphorous modified epoxy resin ester having an epoxy resin content ranging from 40 to 90% by weight and having a phosphorus content ranging from 0.5 to 3% by weight, all percentages by weight being based on the weight of the epoxy resin ester,
   the sum of the proportions by weight of components (A1) and (A2) being 100% by weight, and the proportions by weight being based on the solids content of the binder components (A1) and (A2).

2. A coating composition according to claim 1, wherein the binder comprises:
- (A1) from 50 to 90% by weight of the hydroxyl-containing polyester,
- (A2) from 4 to 40% by weight of the water-thinnable, phosphorous modified epoxy resin ester, and
- (A3) from 5 to 15% by weight of a water-thinnable, hydroxyl-containing epoxy resin-modified alkyd resin, the sum of the proportions by weight of the components (A1), (A2) and (A3) being 100% by weight, and the proportions by weight being based on the solids content of the binder components (A1), (A2) and (A3).

3. A coating composition according to claim 1, wherein component (A1) comprises at least one hydroxyl-containing polyester having an OH number ranging from 20 to 160 mg of KOH/g, an acid number ranging from 20 to 90 mg of KOH/g, and having a number-average molecular weight ranging from 700 to 3,000 g/mol.

4. A coating composition according to claim 1, wherein component (A1) comprises at least one polyesters which is obtainable using at least one of the following compounds: trimellitic anhydride, trimethylolpropane, neopentylglycol, and hexanediol.

5. A coating composition according to claim 2, wherein component (A3) comprises at least one epoxide-modified alkyd resin having an epoxy resin content ranging from 10 to 40% by weight based on the overall weight of the alkyd resin, and an alkyd resin content ranging from 15 to 60% by weight based on the weight of the alkyd resin without the epoxy resin component.

6. A coating composition according to claim 2, further comprising (A4) at least one carboxyl-containing polymer, wherein component (A4) is different from any of components (A1) to (A3).

7. A coating composition according to claim 1, wherein the crosslinker component comprises at least one amino resin.

8. A coating composition according to claim 1, comprising:
- A) from 10 to 40% by weight of the binder component (A1),
- B) from 4 to 15% by weight of the crosslinker component,
- C) from 10 to 76% by weight of a solvent component, and
- D) from 10 to 45% by weight of a pigment component and/or a filler component.

9. A coating composition according to claim 1 comprising:
- A) from 10 to 75% by weight of the binder component,
- B) from 8 to 30% by weight of the crosslinker component, and
- C) from 10 to 80% by weight of a solvent component.

10. A process for preparing the coating composition recited in claim 1, wherein the pigment component and/or filler component is first incorporated into the coating composition by dispersion, followed by the incorporation of a solvent component.

11. A metal substrate coated with the coating composition recited in claim.

12. A packaging container coated with the coating composition recited in claim 1.

* * * * *

UNITED STATES PATENT AND TRADEMARK OFFICE
CERTIFICATE OF CORRECTION

PATENT NO.    : 6,168,865 B1
DATED         : January 2, 2001
INVENTOR(S)   : Koster et al.

It is certified that error appears in the above-identified patent and that said Letters Patent is hereby corrected as shown below:

Claim 4, Column 19,
Line 23, change "polyesters" to --polyester--;

Claim 8, Column 20,
Line 12, delete "(A1)"; and

Claim 11, Column 20,
Line 30, insert --1-- after "claim".

Signed and Sealed this

Seventeenth Day of July, 2001

Attest:

NICHOLAS P. GODICI
Attesting Officer   Acting Director of the United States Patent and Trademark Office